United States Patent
Hu et al.

[11] Patent Number: 6,146,249
[45] Date of Patent: Nov. 14, 2000

[54] APPARATUS AND METHOD FOR POLISHING A FLAT SURFACE USING A BELTED POLISHING PAD

[75] Inventors: Albert Hu, San Jose; Burford J. Furman, Mountain View; Mohamed Abushaban, San Jose, all of Calif.

[73] Assignee: Aplex, Inc., Sunnyvale, Calif.

[21] Appl. No.: 09/177,089

[22] Filed: Oct. 22, 1998

Related U.S. Application Data

[62] Division of application No. 08/803,623, Feb. 21, 1997.

[51] Int. Cl.[7] ...................................................... B24B 1/00
[52] U.S. Cl. ............................................. 451/41; 451/296
[58] Field of Search ................................ 451/296, 41, 60, 451/285, 299, 287, 289, 288, 303, 307, 8, 9, 10, 11, 56, 268, 269, 300

[56] References Cited

U.S. PATENT DOCUMENTS

| | | | |
|---|---|---|---|
| 2,416,493 | 2/1947 | Newton | 451/241 |
| 2,934,279 | 4/1960 | Nestor et al. | 451/296 |
| 3,656,265 | 4/1972 | Schaffner, Jr. | 451/41 |
| 5,575,707 | 11/1996 | Talieh et al. | 451/307 |
| 5,593,344 | 1/1997 | Weldon et al. | 451/307 |
| 5,692,947 | 12/1997 | Talieh et al. | 451/307 |
| 5,722,877 | 3/1998 | Meyer et al. | 451/59 |
| 5,791,969 | 8/1998 | Lund | 451/41 |
| 5,800,248 | 9/1998 | Pant et al. | 451/41 |
| 5,897,425 | 4/1999 | Fisher, Jr. et al. | 451/41 |
| 5,928,062 | 7/1999 | Miller et al. | 451/41 |

*Primary Examiner*—Derris H. Banks
*Attorney, Agent, or Firm*—Skjerven, Morrill, MacPherson, Franklin & Friel LLP; Edward C. Kwok

[57] ABSTRACT

The present invention relates to an apparatus and method of Chemical Mechanical Planarization ("CMP") for wafer, flat panel display (FPD), and hard drive disk (HDD). The preferred apparatus comprises a looped belt spatially oriented in a vertical direction with respect to a ground floor. A polishing pad is glued to an outer surface of the belt. At an inner surface of the belt, there are a plurality of wafer supports to support the wafers while they are in polishing process. Wafers are loaded from a wafer station to a wafer head using a handling structure before polishing and are unloaded from the wafer head to the wafer station after polishing. An electric motor or equivalent is used to drive the looped belt running over two pulleys. An adjustment means is used to adjust the tension and position of the belt for smooth running. This new CMP machine can be mounted in multiple orientations to save manufacturing space.

14 Claims, 17 Drawing Sheets

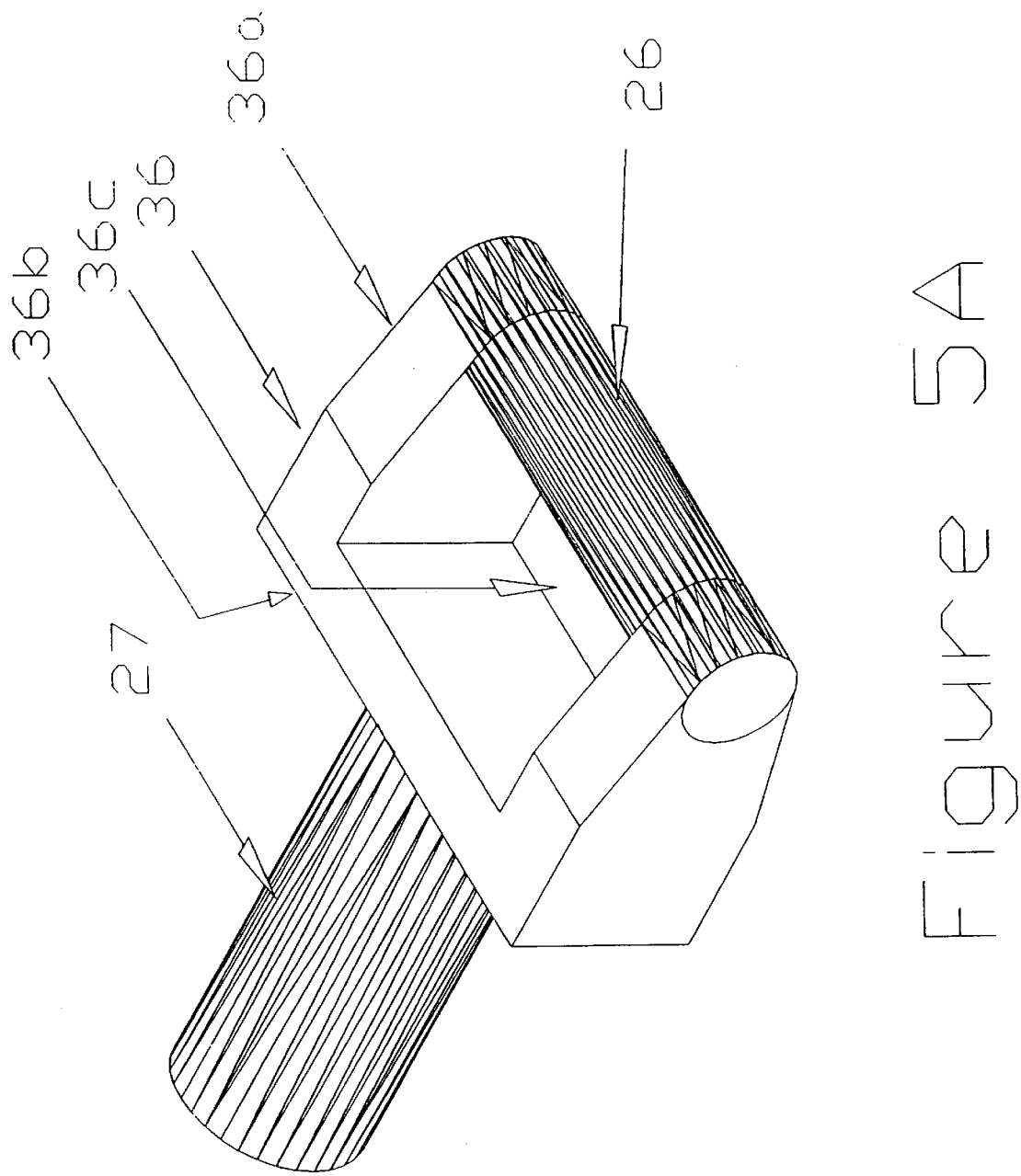

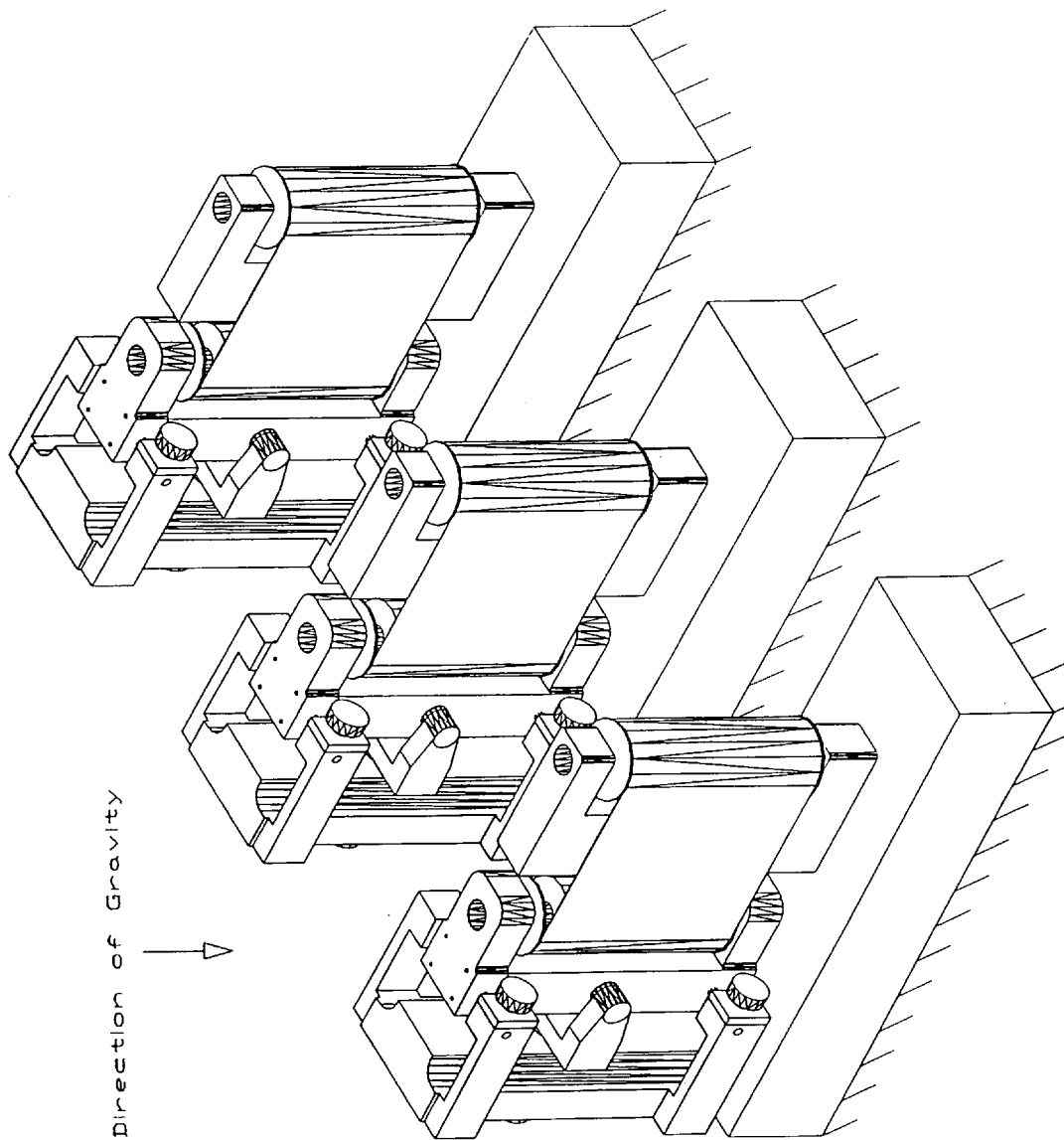

APPARATUS AND METHOD FOR POLISHING A FLAT SURFACE USING A BELTED POLISHING PAD

This is a divisional application of application Ser. No. 08/803,623, filed Feb. 21, 1997 entitled—APPARATUS AND METHOD FOR POLISHING A FLAT SURFACE USING A BELTED POLISHING PAD.

FIELD OF THE INVENTION

The present invention relates to semiconductor and hard drive polishing equipment, particularly, in connection with an apparatus and method of Chemical Mechanical Planarization ("CMP") for wafer, flat panel display (FPD), and hard drive disk (HDD) manufacture employing a belted polishing pad to increase the throughput of polished wafer while reducing the equipment mounting area ("footprint').

BACKGROUND OF THE INVENTION

Planarization techniques are critical for the process of new generation ULSI (Ultra-Large Scale Integrated Circuit) devices such as high-speed, high-computation power CPUs and high-density memory chips. These devices usually comprise multiple layers, with alternating metal and dielectric materials built on top of each other. The metal layers consist of finely spaced, fine-featured interconnect lines to transmit electric signals. The widths of these lines in today's ULSI devices are in the 0.5 μm range or smaller. The dielectric layers provide electrical isolation and mechanical support for the metal interconnect lines. The dielectric materials, typically SiO2, also fill the space between the metal lines. Each of the metal lines is "patterned" or fabricated on top of the dielectric layer using lithography methods. The lithography for pattern resolution below 0.5 μm requires that the dielectric layer be extremely planar so that its variation in height be kept in the range of tens of angstroms. The planarity needs to be both local and global over an entire lithography field due to the shallow depth of focus ("DOF") of exposure tools for optical lithography below 0.5 μm.

Conventional techniques used to achieve higher level wafer planarization include irradiating the wafer with a laser; coating the wafer with spin-on glasses, resins or other polymers; and treating the wafer with thermally reflowing materials like BPSG. As an alternative, new dielectric deposition techniques such as TEOS-ozone at atmospheric pressure, ECR CVD and dep/etch/dep schemes in cluster tools are also being used for this purpose. However, none of these conventional planarizing techniques is capable of providing the required global planarity for advanced processes.

CMP is the only known planarization technique that meets the extreme planarity requirements on the global scale. CMP is the process of removing of surface material from the substrate by both mechanical abrasion and chemical etching. During the CMP process, the substrate being polished, such as a wafer, is held on a carrier (head) and is pressed against a polishing pad soaked with an abrasive slurry. Most CMP equipment generates relative circular, orbital, lapping or a combination of these motions between the carriers and the pad to effect mechanical abrasion, while the etchant in the slurry effects chemical etching. While CMP has demonstrated planarization capabilities beyond other current planarization techniques, its constraint has been low-throughput (typically, 20–40 wafers per hour) and, therefore, high cost of ownership.

The material removal rate (or polishing rate) of the CMP process can be determined by the following semi-empirical relationship known as Preston's equation:

$$\text{Removal Rate (angstrom/minute)} = K \times P \times V_{REL}$$

where P is the pressure between the substrate and the pad, $V_{REL}$ is the relative linear velocity between an arbitrary point on the substrate and its projection on the pad, and K is a constant determined by the chemical composition of the slurry, the process temperature, and the pad surface. In traditional CMP equipment, the carrier that holds the wafer is pressed against the pad, which is glued to a horizontal platen. In addition to the rotation of the carrier, the platen has to also rotate to effect a more uniform distribution of relative linear velocities, $V_{REL}$ for all points on the wafer. Concurrent rotation of the carrier and the platen is necessary because, without it, $V_{REL}$ will be zero at the center of the wafer and largest at the edge of the wafer. According to Preston's equation, this will result in a very low removal rate at the center of the wafer and a large removal rate near the edge of the wafer.

It is apparent then to obtain uniform removal rates across the wafer, $V_{REL}$ has to be uniform for all points on the substrate. The substrate is round for wafers and rectangular for FPD. In traditional CMP equipment, the platen has to be sufficiently large to accommodate the carriers which are placed near the edge of the platen, so that the relative linear velocity of the wafer center is close to that of its edge. The typical diameter of the platen is 30 to 36 inches and the typical rotational speed is 20 to 40 rpm. The typical pressure applied to the wafer during CMP process is about 7 psi. When pressing one 8 inch (200 mm) wafer onto the platen at the aforementioned pressure, the total applied force is 352 pdf (pound force). However, to obtain micron level precision and uniformity on polished wafers, the deformation on the rotating platen has to be minimal. To achieve such goals, the platens used in various existing CMP equipment are necessarily large and bulky.

As a result of this size constraint, the aforementioned CMP equipment may not be suitable for polishing new generation FPD and wafer substrates which are in the trend of becoming larger. In particular, if a 12 inch (300 mm) wafer, used in the fabrication of next generation ULSI devices, is pressed onto a platen at the aforementioned pressure, a downward force of 792 pdf will be dynamically loaded on the platen. The platen will then have to be yet larger and bulkier than the current configuration. In addition, if multiple heads are used on the same platen to increase the throughput; for example, 6 heads holding 8 inch (200 mm) wafers, then the total down force on the platen can be as high as 2112 pdf. If three heads holding 12 inch wafers are pressed against the platen, then the total down force can be 2376 pdf. Furthermore, in order to increase throughput, the rotation speed of the platen has to be higher, which requires an even bulkier support for the platen.

The above described CMP processes and apparatuses are therefore far from ideal and need substantial improvements.

First, a major disadvantage of traditional CMP equipment is its limited productivity. The largest relative linear velocity obtainable from the head/platen mechanism used in the traditional CMP equipment is 150 ft/min in practice, which severely limits the largest removal rate achievable by such mechanism.

Second, a large mounting area is another disadvantage of current CMP polishers, because these polishers employ a horizontally oriented large platen. Such polishers commonly have a footprint over 25 square feet, which takes valuable manufacturing space in modem wafer fabrication plants.

Third, as set forth above, the head/platen mechanism employed by current CMP technology is unsuitable for larger wafer and FPD polishing as their sizes increase in the future (i.e, 12 inch wafer). The platen has to be very bulky to provide stability against a large orbital down force.

Fourth, as set forth above, the platen has to be large, or otherwise, an oscillating mechanism which sweeps the carrier across the platen is needed in order to obtain uniform relative linear velocities across a large substrate to achieve a uniform removal rate across the substrate.

There is therefore a need for a new kind of CMP equipment that can increase wafer throughput, reduce the equipment footprint, accommodate the polishing of large wafers or FPDs, and provide a uniform removal rate over the entire substrate being polished.

It is thus an object of this invention to provide a belted CMP machine orientable in multiple directions that has substantially higher throughput, smaller footprint, higher relative velocity (i.e., 600 ft/min) uniformly across the substrate, and a higher degree of planarization in a more compact mechanism than is currently available.

It is a further object of the invention to provide a CMP machine whose design is inherently more suitable to polish large size wafers and FPDs which are otherwise unsuitable and less desirable to be handled by prior art polishers and methods.

It is a further such object of this invention to provide a belted CMP machine having a less bulky construction to generate a high relative velocity without increasing machine size as does in current rotating platen, such machine is provided with a stationary wafer support to eliminate the need for a bulky support as required in current rotating platen so that the machine is preferably orientated in a vertical position relative to a floor space to reduce its footprint to as low as 15 square feet.

It is a further such object to provide a belted wafer polishing machine to increase production reliability and decrease interruption due to machine maintenance, together with higher throughput and better quality, which will result in reduction of cost of ownership.

It is a further such object to provide a method of polishing employing a belted polishing machine provided hereof.

SUMMARY OF THE PRESENT INVENTION

The foregoing objects are realized through the present invention by a CMP machine that will provide a uniform polishing rate on a polished surface of a substrate such as a wafer and a relatively higher throughput of polished substrate with a smaller footprint than existing equipment. The preferred embodiment comprises a looped belt which is spatially oriented in a preferred vertical direction with respect to a ground floor. A polishing pad is glued or affixed to an outer surface of the belt. At an inner surface of the belt, there are a plurality of wafer supports to support the wafers while they are in polishing process. Wafers are loaded from a wafer station to a wafer head using a robotics handling structure before polishing and are unloaded from the wafer head to the wafer station after polishing. An electric motor or equivalent is used to drive the looped belt running over two pulleys. An adjustment means is used to adjust the tension and position of the belt for smooth running.

The CMP machine provided by the present invention uses a running looped belt with a polishing pad glued to the looped belt instead of a rotating platen with a polishing pad glued to the platen. The wafer head holds the wafer and presses it against the belt and the wafer supports. Multiple sets of wafer heads are mounted on the movable handling structure that allows loading and unloading of wafers, while wafers in one set of wafer heads are being polished. This new CMP machine could be mounted in multiple orientations. Several machines could be arranged in different positions to save manufacturing space. In order to take advantages of the belted polishing mechanism, a method employing the belted CMP machine to increase throughput while reducing footprint is also provided by the present invention.

BRIEF DESCRIPTION OF the DRAWING

FIGS. 10A, 10B and 10C are possible spatial orientations of a series of CMP machines according to a preferred embodiment of the invention.

DETAILED DESCRIPTION OF PREFERRED EMBODIMENTS

Figure 1:
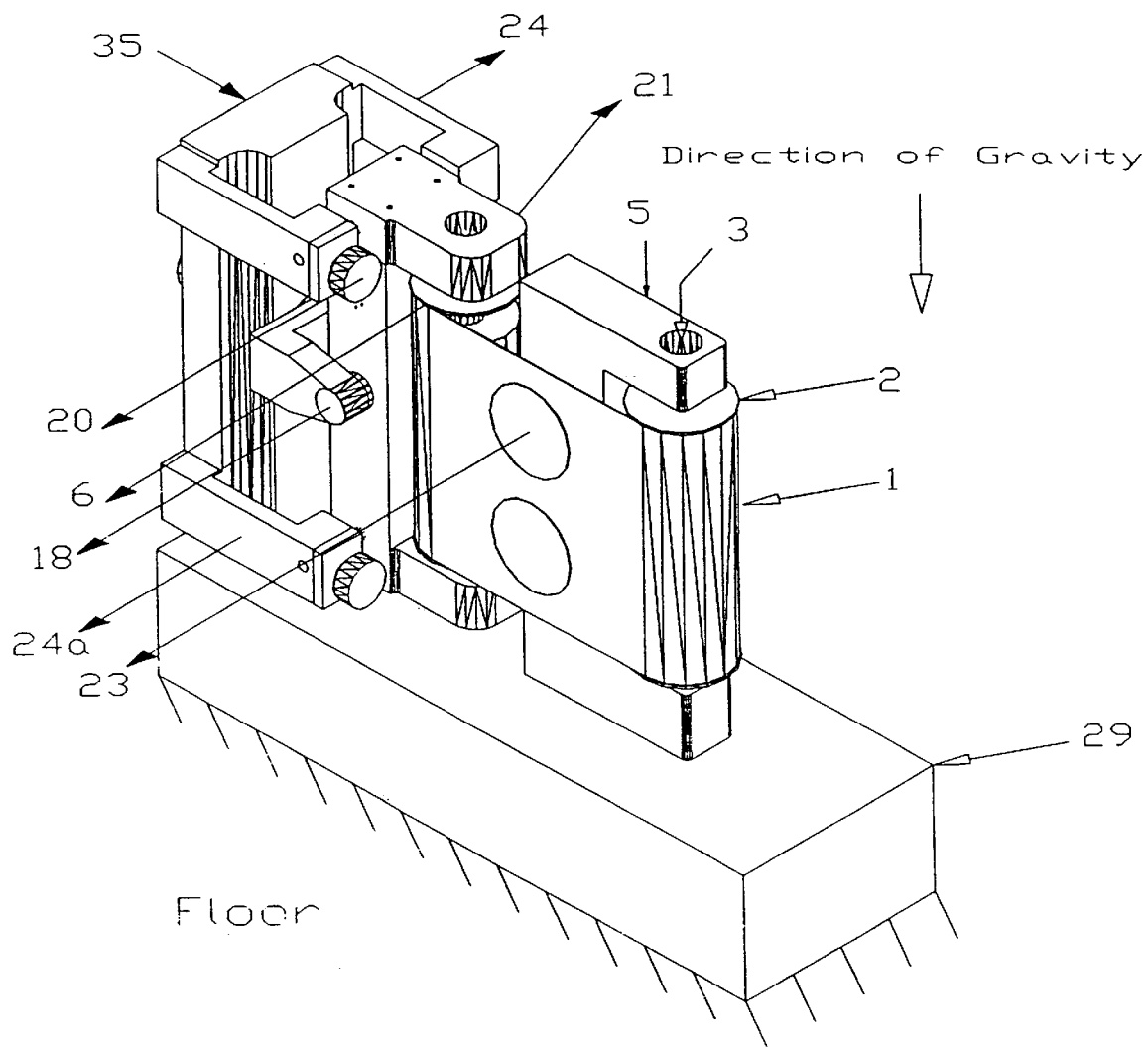
FIG. 1 is a schematic drawing of a CMP machine with a belted polishing pad according to a preferred embodiment of the invention.
Figure 2:
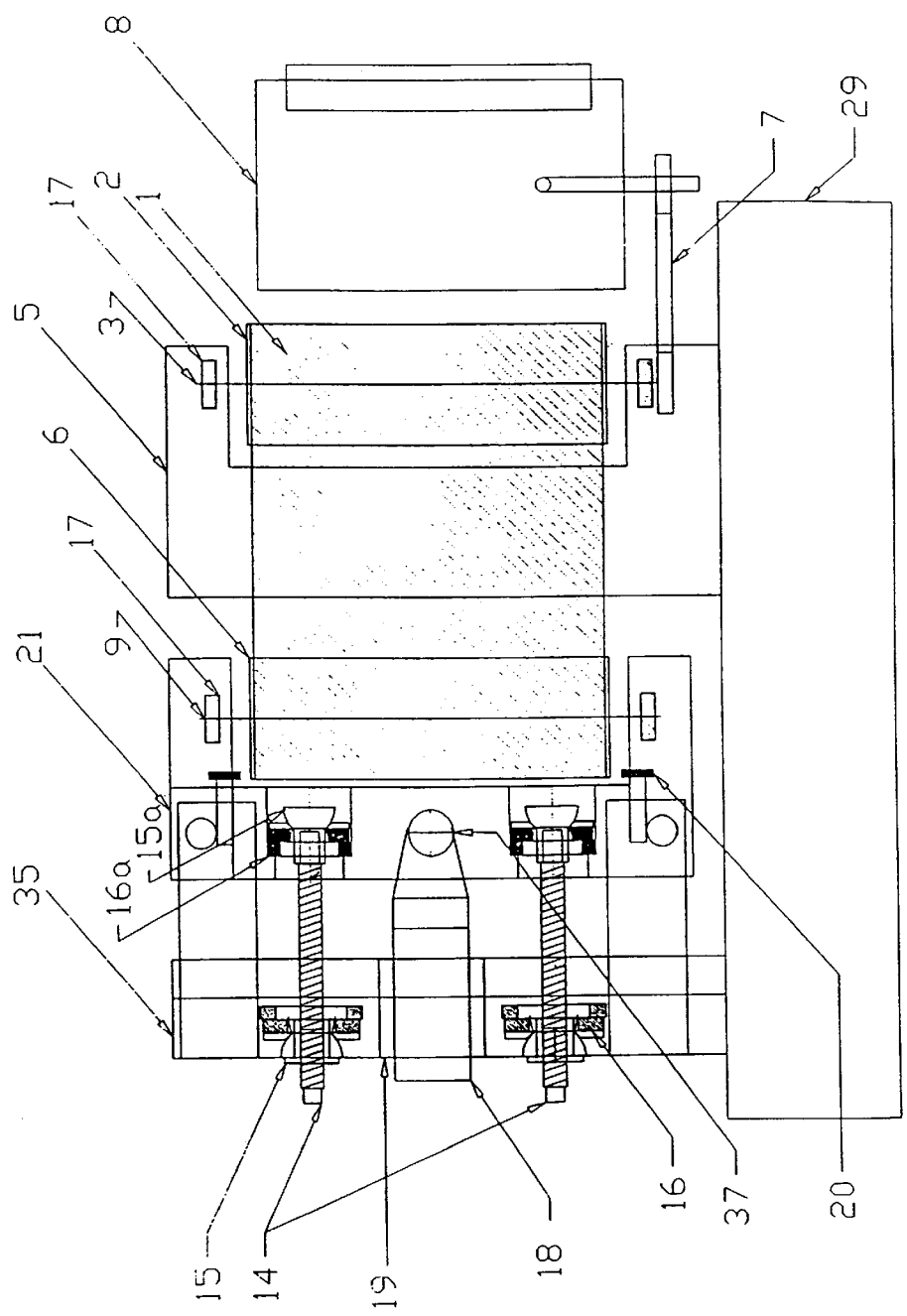
FIG. 2 is a side view of the CMP equipment with a belted polishing pad according to a preferred embodiment of the invention.
Figure 3:
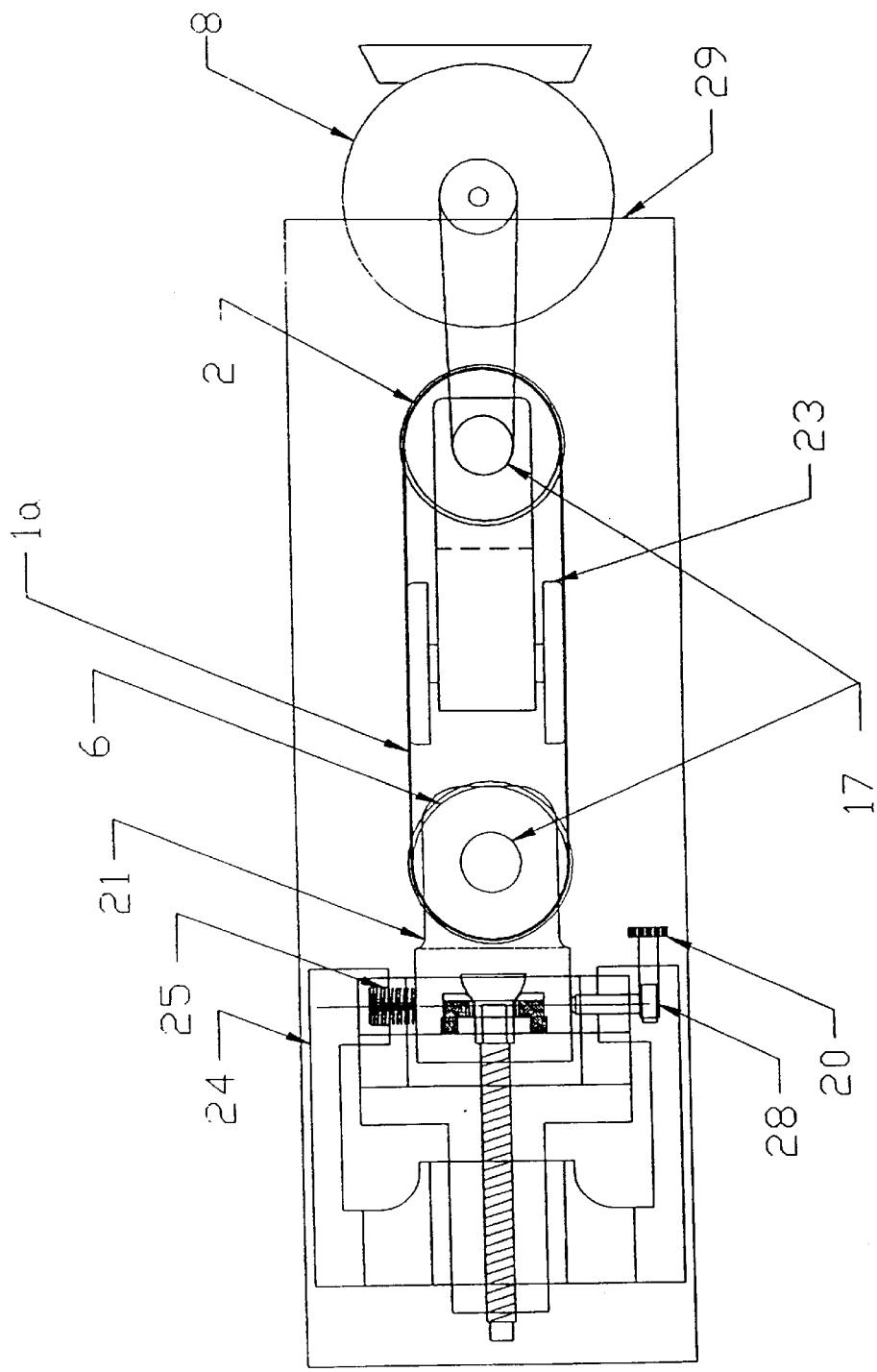
FIG. 3 is a top view of the CMP equipment with a belted polishing pad according to a preferred embodiment of the invention.

Referring to FIGS. 1, 2 and 3, it is seen that a preferred embodiment of a multi-oriented belted CMP machine of the invention comprises a looped belt 1 with a polishing pad 1*a* glued to an outer surface of the belt 1, a base 29, one fixed pulley 2 held by a fixed pulley fixture 5, coupled to a brushless AC motor 8 or any other suitable motor through a coupling means 7. The coupling means 7 may be either a v-belt or double chains, whichever is found to be more suitable to support the high torque required to run the belt 1. The multi-oriented belted CMP machine further comprises an adjustable pulley 6 held by an adjustable pulley fixture 21 to provide an adjustment mechanism, in connection with other elements as will be described below, to control one linear and two rotational adjustment motions of the adjustable pulley 6 through which tensions of the belt 1 can be properly adjusted and controlled. The pulleys 2 and 6 could be flat or flanged. If a flanged pulley is adopted, it would help for cross track adjustments. In this preferred embodiment, flat pulleys are used herein.

Figure 7A:
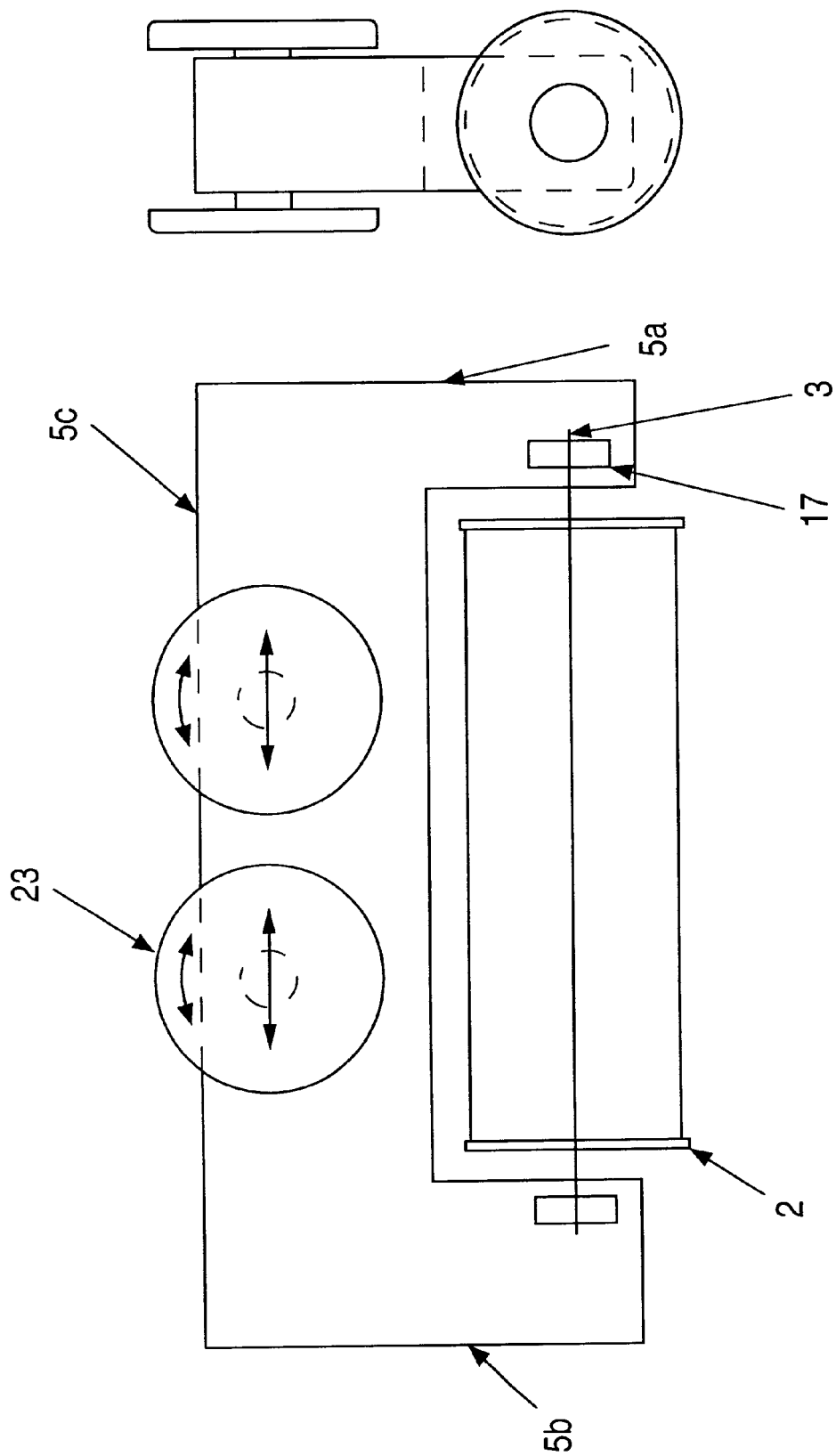
FIGS. 7A and B show a top view and side view of a fixed pulley fixture and wafer supports in accordance with the invention.

The fixed pulley fixture 5, as also shown in FIG. 7A and B, has a top member 5a and a bottom member 5b, both of which are integrally connected with a vertical member 5c which is vertically disposed between a half length of the top member 5a and the bottom member 5b to define a space to accommodate the fixed pulley 2. The fixed pulley fixture 5 further consists of a shaft 3, two spherical roller ball bearings 17 and a plurality of wafer supports 23. The shaft 3 penetrates through the fixed pulley 2 and spans an entire length of the aforementioned space to connect the first and the second spherical roller ball bearings 17 located respectively on the top member 5a and the bottom member 5c until one end of the shaft 3 that connects with the bottom member 5c of the fixed pulley fixture 5 becomes couplingly engaged with the coupling means 7 to provide a driving mechanism for the fixed pulley 2. The bottom member 5b of the fixed pulley fixture 5 is firmly mounted on the base 29 which is securely installed on a floor space. Each of the wafer supports 23 is mounted through a wafer shaft 23a by the aid of a wafer shaft pin 23b to either a front or a rear side of the vertical member 5c so that the wafer supports 23 are disposed in an immediate contact with inner surfaces of the belt 1. The wafer shaft pin 23b is removably mounted on the wafer shaft 23a from a side of the vertical member 5c other than from the front and the rear sides of the vertical member 5c to permit easy assembly and change of the wafer supports 23. A shaft limit 23c is provided between the wafer supports 23 and the wafer shaft 23a to prevent retraction of the wafer shaft 23a inside the vertical member 5c during the polishing process. The wafer supports 23 may be in a variety of sizes and shapes depending on the sizes and shapes of wafers, devices, or any other substrates or materials to be polished. The sizes of wafer supports 23 are generally slightly larger than the sizes of wafers to compensate for any potential misalignment of wafers on the wafer supports 23.

Referring jointly to FIGS. 1, 2, 3, 5 and 6, the adjustment mechanism described above is now discussed. The adjustment mechanism comprises a supporter 35, a shaft mechanism 18, two pairs of adjustment arms 24 and 24a, a pair of ball screws 14, a pair of worm gears 28 meshed in a pair of adjustment screws 20. The supporter 35 is fixedly mounted through its bottom end on the base 29 to provide physical support for the adjustable pulley fixture 21 and to hold the shaft mechanism 18. The shaft mechanism 18, as shown in FIGS. 5A and B, consists of a polished shaft 27, a pivot shaft 26 and a yoke 36. The yoke 36 has two side arms 36a and a transverse member 36b which is integrally linked with and between the two side arms 36a such that the yoke 36 binds the polished shaft 27 and the pivot shaft 26 together as one single physical unit in such a way that one end of the polished shaft 27 is removably connected to an underside of the transverse member 36b of the yoke 36 and the pivot shaft 26 is transversely connected between the two side arms 36a of the yoke 36 to form a concavity 36c which allows some freedom for the adjustable pulley fixture 21 to move around the shaft mechanism 18 in response to an adjustment motion. The supporter 35 has a polished hole 19 located around a middle portion thereof at which the polished shaft 27 goes through the supporter 35 and becomes engaged with the supporter 35. Meanwhile, the pivot shaft 26 of the shaft mechanism 18 also engages with the adjustable pulley fixture 21 through a honed hole 37 in a middle portion of the adjustable pulley fixture 21 to enable the shaft mechanism 18 to perform two adjustable motions, one linear along a path defined by the polished hole 19 which is in the same plane of the belt 1 and one rotation motion around an axis of the linear motion. The shaft mechanism 18, through the pivot shaft 26, can also rotate around an axis perpendicular to the plane of the belt 1 through the joint actions of the pair of ball screws 14 and the pair of worm gears 28 as will be described below.

Figure 8:
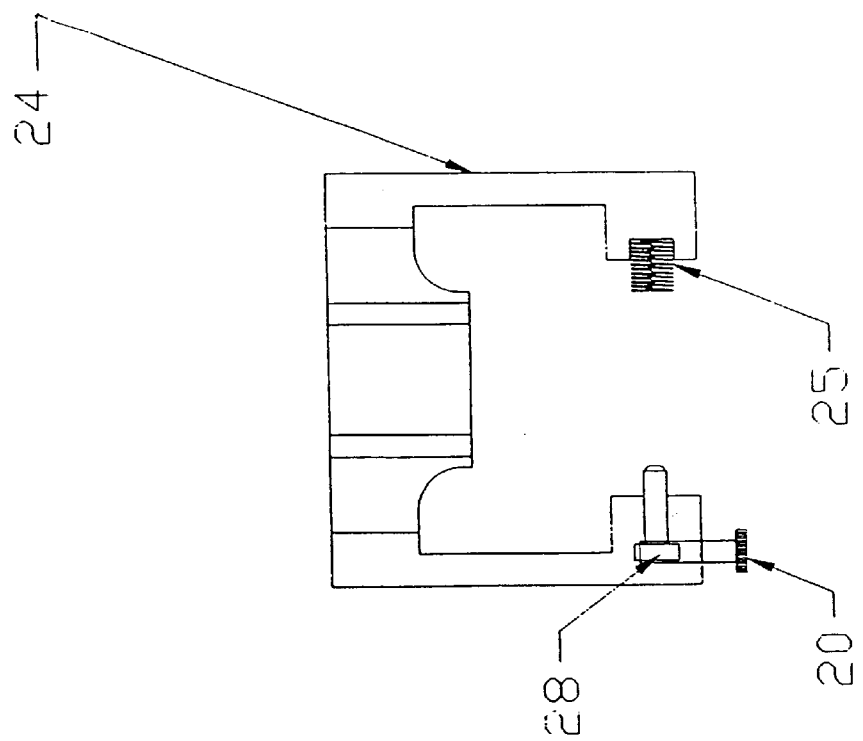
FIG. 8 shows the fixture supporting the adjustable pulley fixture.
Figure 8:
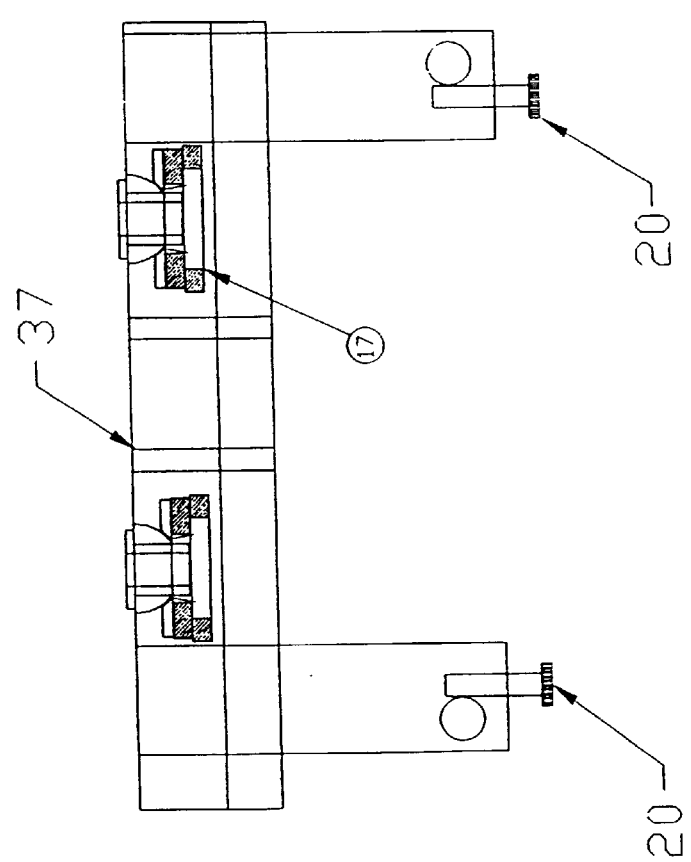

The first pair of the adjustment arms 24 is fixedly mounted on a top portion of the supporter 35 and the second pair of the adjustment arms 24a is fixedly mounted on a lower portion of the supporter 35 to provide adjustment movements respectively for a top and a bottom portion of the adjustable pulley fixture 21 in accordance with the correspondent mounting positions of the adjustment arms 24, 24a on the supporter 35. As shown in FIGS. 2 and 8, each pair of the adjustment arms 24, 24a has a first arm and a second arm. The adjustment movements are controlled by utilizing the joint actions of a spring 25 compressibly disposed at a bottomed hole on the first arm against the adjustable pulley fixture 21 and of the adjustment screw 20 mounted on the second arm which forces the worm gear 28 to move backward or forward against the adjustable pulley fixture 21 or vice versa. Since the spring 25 and the warm gear 28 are located on the respective arms opposite to each other, the worm gear 28 is used to rotate the adjustable pulley fixture 21 in one direction and the spring 25 is used to rotate the adjustable pulley fixture 21 in an opposite direction around the polished shaft 27 of the shaft mechanism 18. This rotation is very small and ranges from 2° to a maximum of 5°.

Figure 6:
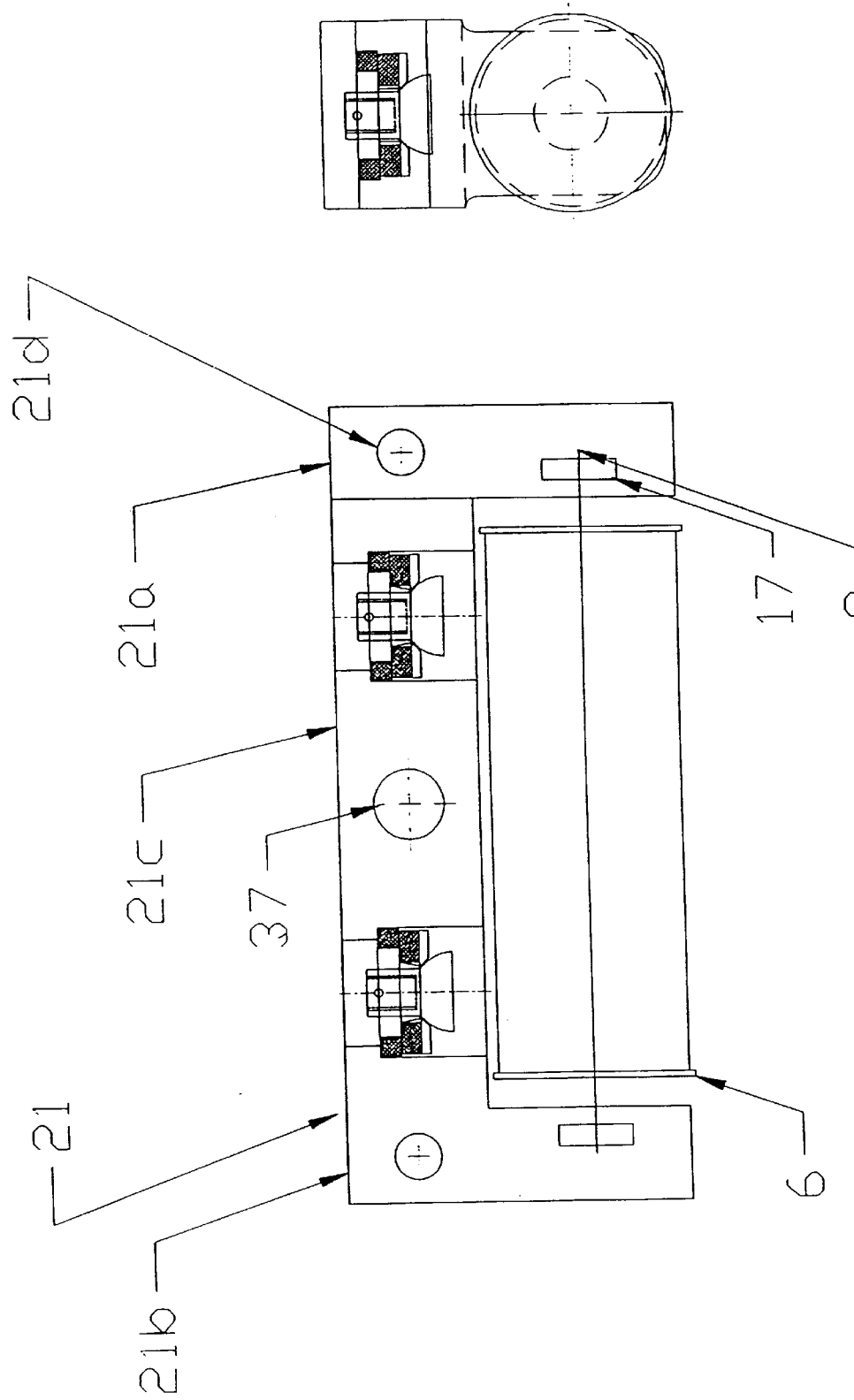
FIG. 6 is a top view and side view of a adjustable pulley fixture according to a preferred embodiment of the invention.

Referring jointly to FIGS. 2, 3 and 6, the adjustable pulley fixture 21 holds the adjustable pulley 6 using a pair of spherical roller ball bearings 17, which connect with a pulley shaft 9 so that the adjustable pulley 6 can rotate freely around the pulley shaft 9 upon the activation of the motor 8. The adjustable pulley fixture 21 has a top block 21a and a bottom block 21b, both of which are removably connected with a vertical block 21c which is vertically disposed between a half length of the top block 21a and the bottom block 21b to define a space to accommodate the adjustable pulley 6. The top block 21a and the bottom block 21b are connected with the vertical block 21c through a screw 21d. The screw 21d is removably screwed on the vertical block to permit removal of the top block 21a and the bottom block 21b for easy removal and change of the belt 1.

Figure 9:
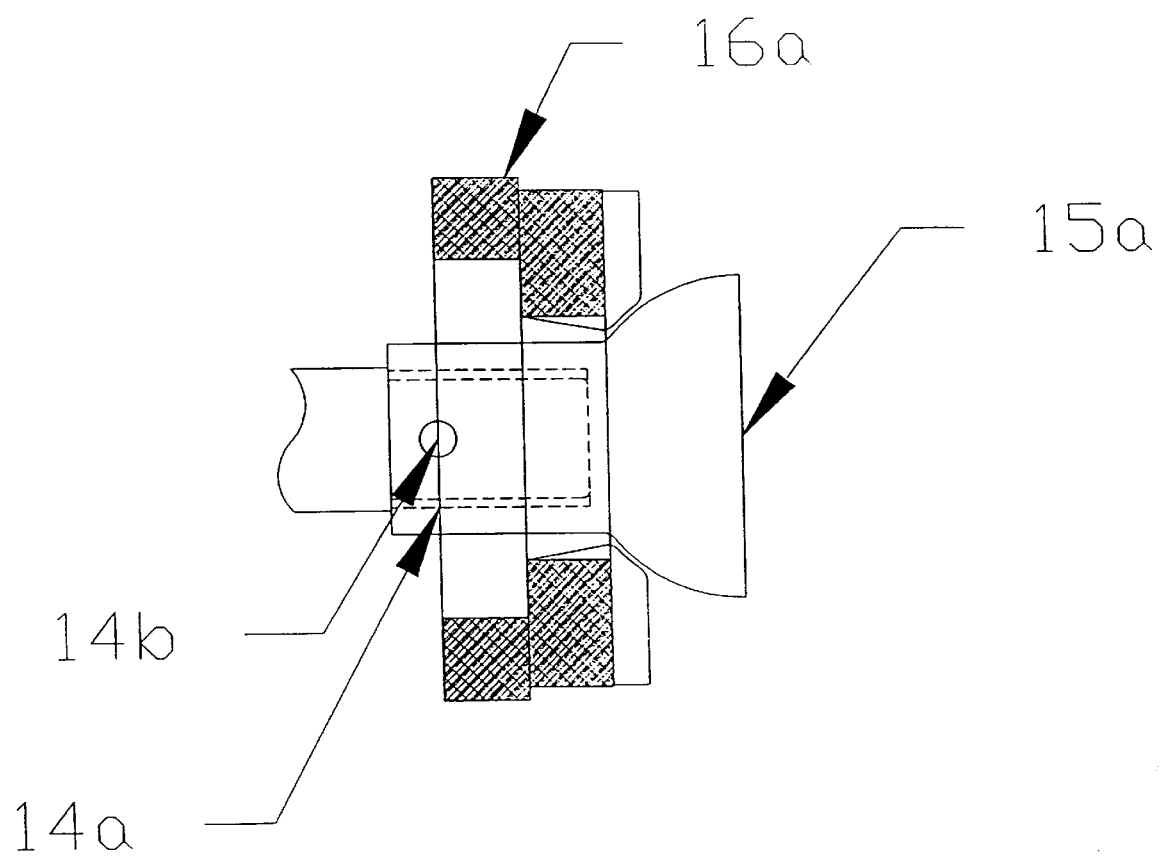
FIG. 9 shows a spherical thrust ball bearing which allows rotation and linear movement.

Referring to FIGS. 2, 9, the supporter 35 further comprises a first pair of ball nuts 15, each mounted respectively against a spherical thrust ball bearing 16 on the supporter 35 at a location above and below the polished hole 19. In order for the pair of ball screws 14 to assume an adjustment function for the adjustable pulley fixture 21, a second pair of ball nuts 15a are mounted on the adjustable pulley fixture 21 against a second pair of spherical thrust ball bearings 16a at positions corresponding to their counterparts on the supporter 35. As such, the adjustable pulley fixture 21 hold by the supporter 35 through the shaft mechanism 18 and the pair of ball screws 14. Each of the ball screws 14 has a pointed end and flattened end. As shown in FIG. 9, each of the flattened end has an internal threading 14a and a fixing pin 14b through which each of the flattened ends is fixedly mounted inside the ball nuts 15a on the adjustable pulley fixture 21. Each of the pointed ends of the ball screws 14 tightly yet adjustably screwing onto the ball nut 15 on the supporter 35. The two ball screws 14 and ball nuts 15 could be placed in a reversed direction without losing their functionality. These two ball screws 14 can be adjusted independently in an opposite direction coupling with the shaft mechanism 18 to adjust the adjustable pulley fixture 21 by rotating the adjustable pulley fixture 21 around an axis perpendicular to the plane of the belt 1. Alternatively, the two ball screws 14 could be adjusted in the same direction to tighten or to loosen the tension of the belt 1.

The adjustment for the adjustable pulley fixture 21 serves the following two purposes. First, it provides a cross track adjustment for the lateral position of the belt 1. Second, it provides a precise control and adjustment for belt tensioning to ensure a uniform tension in the belt 1 irrespective of any conical shape in the belt 1.

The belt tensioning is controlled by the linear movement of the adjustable pulley fixture 21 holding the adjustable pulley 6. As described above, the adjustable pulley fixture 21 can be adjusted in a variety ways to achieve a desirable belt tensioning. For instance, the adjustment mechanism provided by the action of the ball screws 14 coupling with the shaft mechanism 18 is used for this purpose to allow equal tension at two sides of the belt 1. After the tension is adjusted in the belt 1 using the two independent ball screws, the cross track is adjusted by two rotational movements described below.

The cross track adjustment is controlled by having two degrees of freedom for movements (i.e., rotational movements around two perpendicular axes) in addition to the required rotation of the adjustable pulley 6 around the shaft 9 of the adjustable pulley 6 and the linear motion of the adjustable pulley 6 along the plane of the belt 1. More specifically, the first rotation axis is in the same plane of the linear motion (perpendicular to the shaft 9 of the adjustable pulley 6) and passes through a middle point of the shaft 9. The second rotation axis lies on a plane perpendicular to the first plane defined above by the first rotation axis and also passes through the middle point of the shaft 9 of the adjustable pulley 6. This rotation takes place around a cylindrical part of the polished shaft 27 which fits inside the polished hole 19. As such, the adjustable pulley 6 has three degrees of freedom for adjustment movements, one linear and two rotational, in addition to the rotational movement driven by belt 1.

Figure 7B:
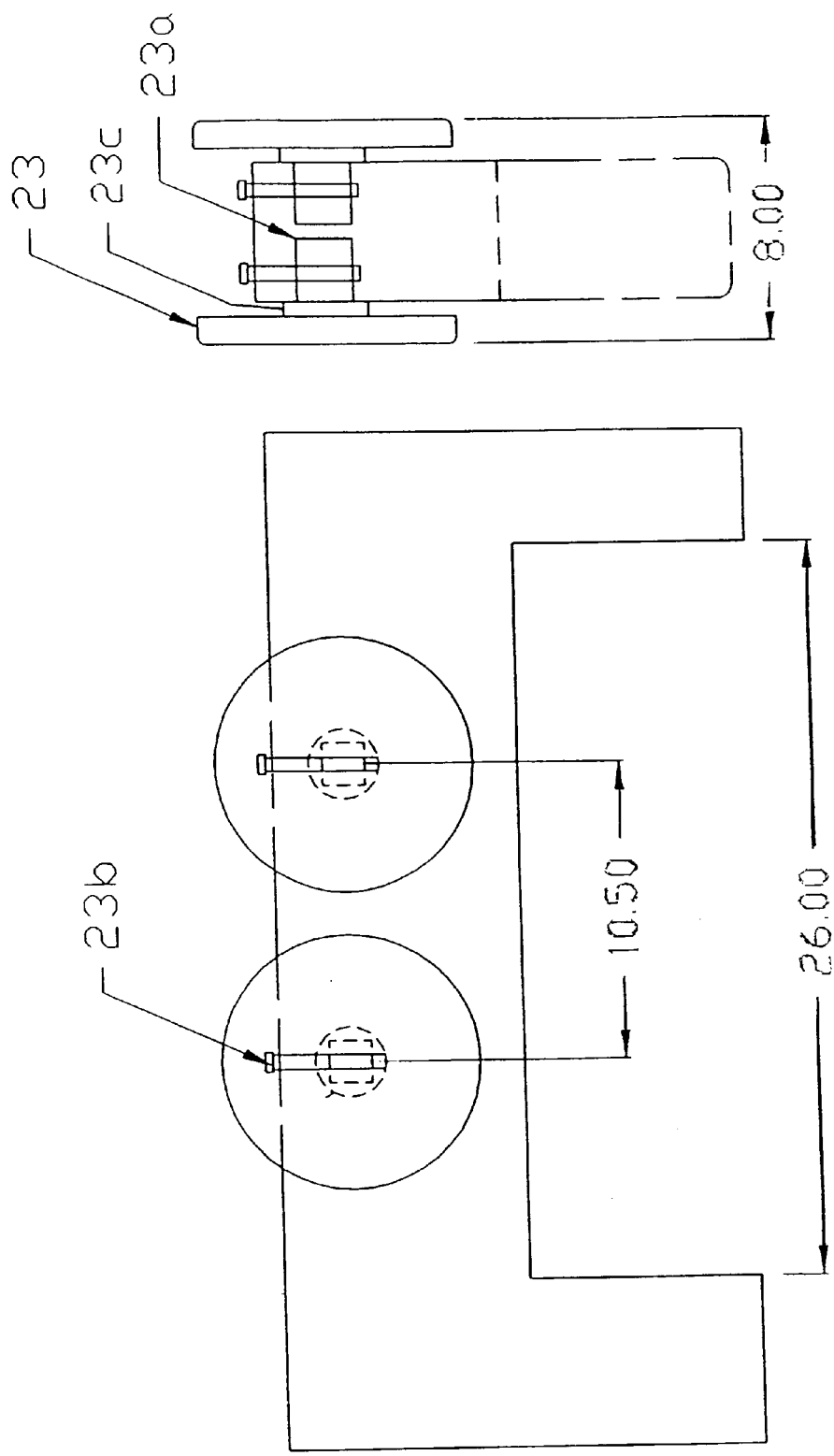

Referring back to FIGS. 1 and 3, the wafer supports 23 are further described. The wafer supports, as discussed above, may be in a variety of different sizes and shapes depending on the diameters and shapes of the wafers or the semiconductor devices to be polished. In a preferred embodiment of the invention, the wafer supports 23 are flat circular plates with rounded edges as shown in FIG. 7. The wafer supports 23 serve to keep the belted polishing pad flat to help reduce any potential edge effects on the polished wafers. In order to take advantages of such design, a wafer handling structure 40 may be conveniently arranged or placed on outside surfaces of the belt 1 at a position directly opposite to the correspondent wafer supports 23 so that the wafers are held and pressed against the padded polishing belt 1. The wafer supports may be designed to be rotary along an axis perpendicular to the polishing belt 1 or to perform some oscillatory rotation by moving upward and downward along the vertical member 5c or a combination of both. In the alternative, as a preferred embodiment of the invention, the wafer supports are stationary on the vertical member 5c of the fixed pulley fixture 5. In such case, the only required motion during the polishing is the rotational movement of the looped belt 1.

Figure 4A:
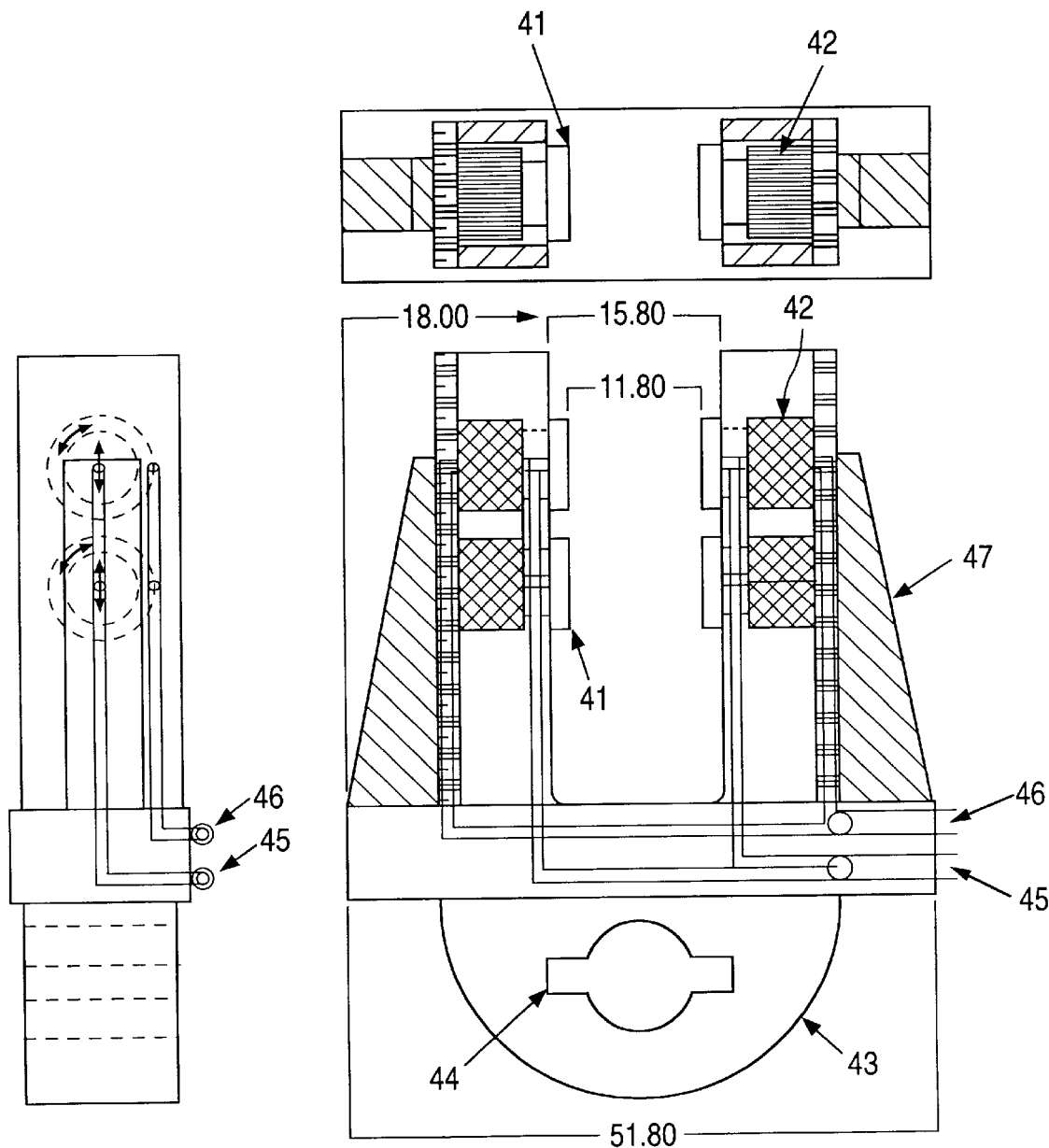
FIG. 4 shows a handling structure according to the invention; A is the top view and side view of the handling structure; B shows the handling structure in either a moving or a polishing position; and C shows a top loading position of the handling structure relative to the belted polishing pad.
Figure 4B:
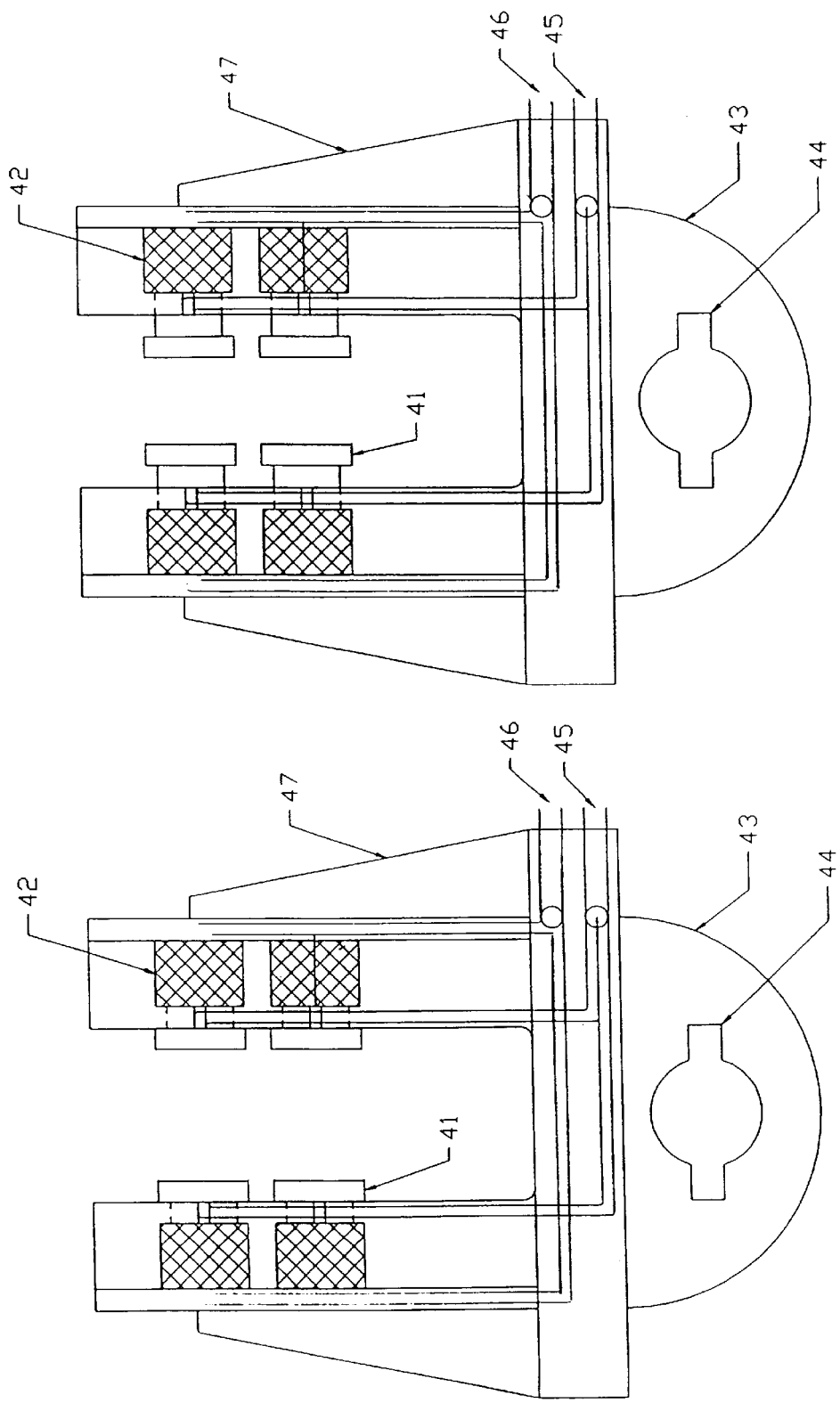

Referring now to FIGS. 4A, B and C, the wafer handling structure 40 is further illustrated. As stated above, the wafers are generally loaded and unloaded using the wafer handling structure 40 that handles wafers to and from the loading and unloading stations (not shown). The wafer handling structure 40 comprises a flange base 43 and a pair of parallel handling arms 47 extended therefrom. Each of the handling arms comprises a plurality of wafer heads 41 for holding wafers. Each of the wafer heads 41 is integrally connected with a pressing means 42 which is formed as an internal structure of the handling arms 47. The pressing means is recessable within the handling arms 47 while the wafer handling structure 40 is moving along a production line or a rail through a shaft pivot 44 located at a middle portion of the flange base 43. The pressing means can be extended and extruded out of the handling arms while the wafer handling structure 40 is loading, unloading wafers and during wafer polishing. The function of the pressing means is to provide force necessary to be applied to the wafers which are being polished against the polishing pad 1b. The wafers are held by the wafer heads 41 by a partial vacuum which is provided to the wafer heads 41 directly through a vacuum line 45. The pressing means 42 may be a pneumatic cylinder which is connected with a compressed air line 46 to provide pneumatic force. Alternatively, the pressing means 42 may be an electric motor which is provide by an electric wire or may be any other suitable means capable of providing mechanical, hydraulic or pneumatic force to be applied to the wafers which are being held against the polishing pad 1b. Since the wafer handling structure 40 provided by the invention does not need rotational and transverse movement, the driven motor and related complex control mechanism that are needed in the prior art polishing machines are eliminated and avoided.

Figure 4C:
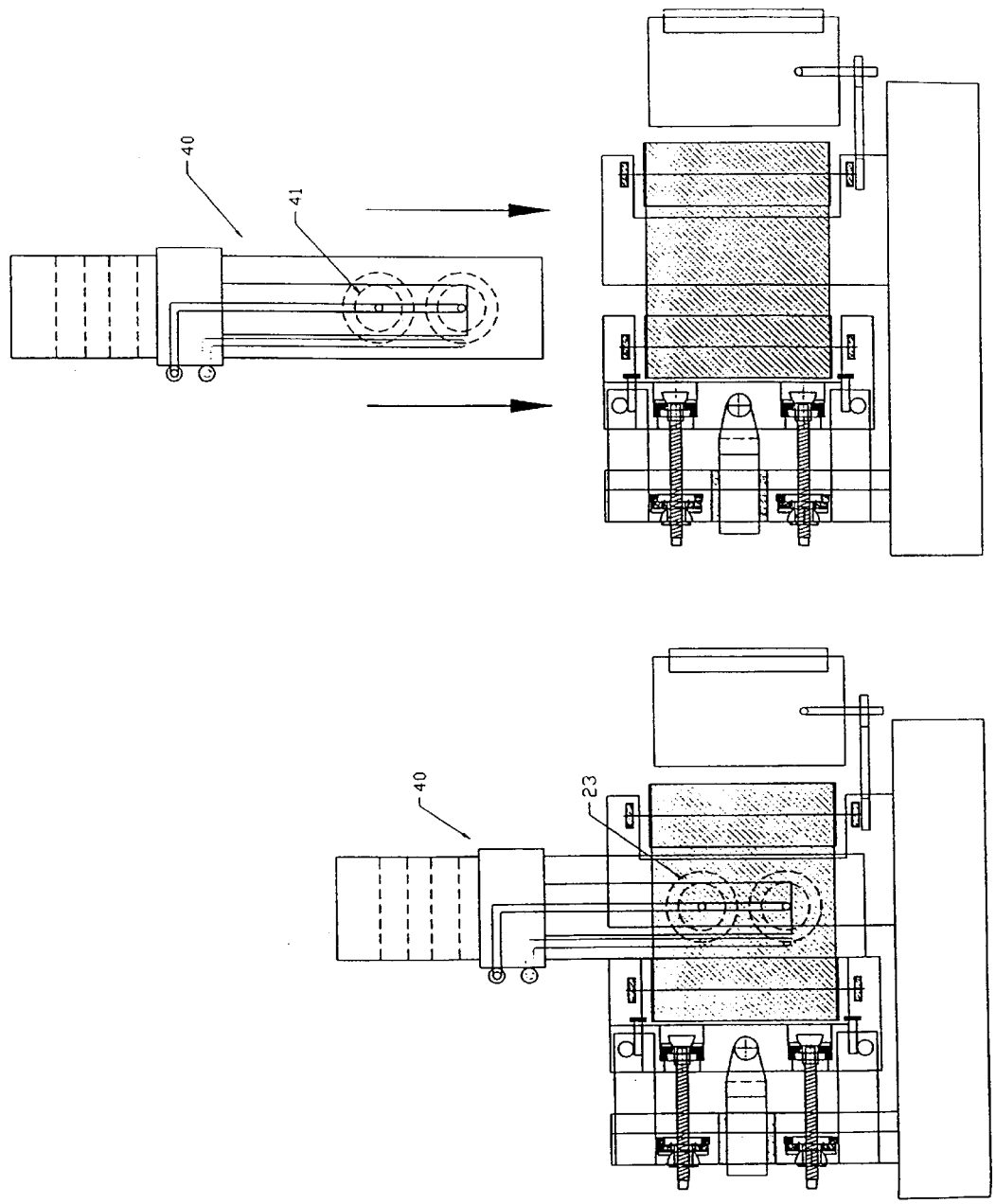
Figure 5B:
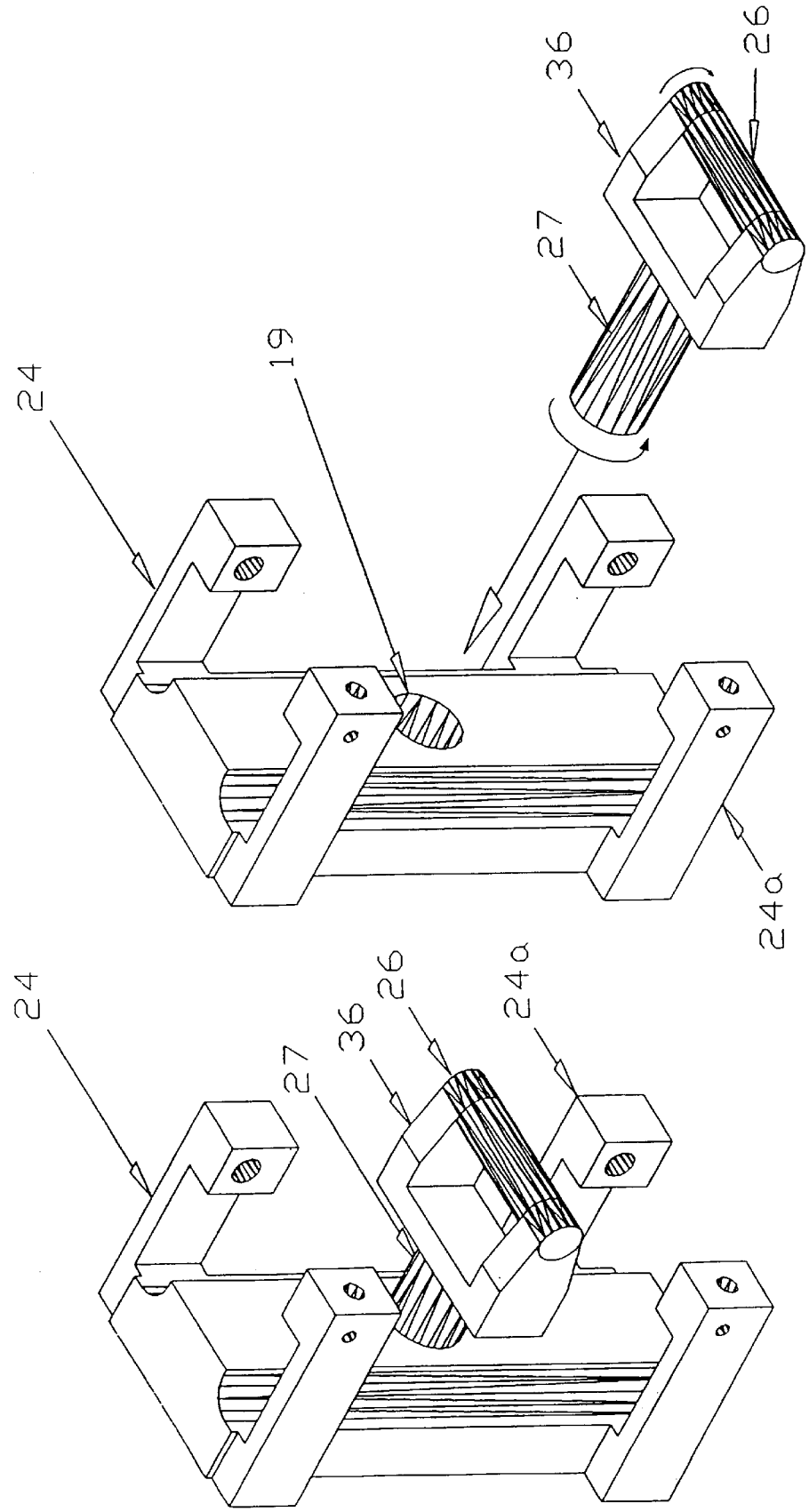
FIG. 5 shows a shaft mechanism that permits a linear and rotational movement; A illustrates a polished shaft and a pivot shaft; and B shows the shaft mechanism mounted on a supporter.

The wafers are handled in a vertical position when the orientation of the machine is vertical relative to a floor on which the CMP machine is securely installed. The wafer handling structure 40 can move towards the polishing padded belt 1 in a variety ways depending on the orientations of the polishing machines. As shown in FIG. 4C, a top loading wafer handling structure 40 is illustrated in which the handling structure 40 moves from a top side of the CMP machine toward the polishing belt 1 until the wafer heads 41 are matchably aligned with the wafer supports 23 along the vertical member 5c of the fixed pulley fixture 5. The pneumatic cylinders or other pressing means 42 will extend to move the wafer heads 41 away from their respective handling arms 47 until the wafer heads 41 touch the padded belt 1 applying a pressure of approximately 7 psi depending on the required removal thickness. It is conceivable from the known art related to CMP process that one set of wafers could be polished while another set (or multiple sets) are being loaded and unloaded. Additionally, the wafer heads 41 could be stationary on the handling arms 47 without any substantial movement or, in the alternative, the wafer heads 41 may be rotated along an axis perpendicular to the polishing belt 1 or to perform some oscillatory rotation by moving upward and downward along the handling arms 47 or a combination of both.

The multi-oriented belted CMP machine is able to perform polishing for both the primary and touch up stages using different polishing pads. After the polishing process (whether primary or touch up) is done, the pneumatic cylinders 42 retract causing the wafers to move away from the polishing padded belt where the wafers are monitored either for dielectric thickness or for next polishing stage. After the wafer gets back to the loading and unloading stations, it will be sent to cleaning station before final use.

The number of wafer supports and therefore the number of wafers that may be mounted on and polished by the multi-oriented belted CMP machine in accordance with the present invention may be varied with the sizes and lengths of the polishing belt 1 and the sizes of the wafer supports 23.

For instance, for the purpose of illustration without limitation, two wafer supports 23 at each side of the fixed pulley fixture 5 are used for 8 inch wafers and one wafer support is used for 12 inch wafers. It is obvious that with size and length change of the polishing belt 1, the multi-oriented belted CMP machine can easily accommodate more wafer polishing at the same time with out adding complex mechanical control mechanisms. Thus, the CMP machine provided by the present invention can not only enhance the processing throughput for smaller wafers, but also provide easy flexibility for processing of larger wafers. The wafer supports 23 are positioned side to side (in case of 8 inch wafers) so as to prevent any damage to other wafers in case that one wafer breaks during the polishing process. The wafer supports 23 are slightly bigger than the wafer's diameter so as to prevent any belt sagging or bending down to ensure that the wafer surface is always parallel to the surface of the padded belt 1. Polishing pad conditioners (not shown), which are well known prior art, may be located at opposite sides of the belt 1 (before the belt goes around the pulley 2 and 6) so as to remove any particles from the polishing pad 1b and to improve the performance of the belt 1 before it moves to the next wafer.

Figure 11:
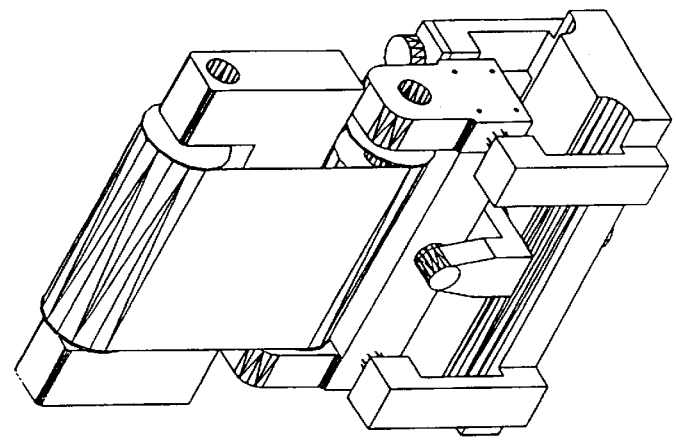
FIG. 11 shows alternative orientations for the CMP machines according to the invention where the belt is rotating vertically with reference to floor.
Figure 11:
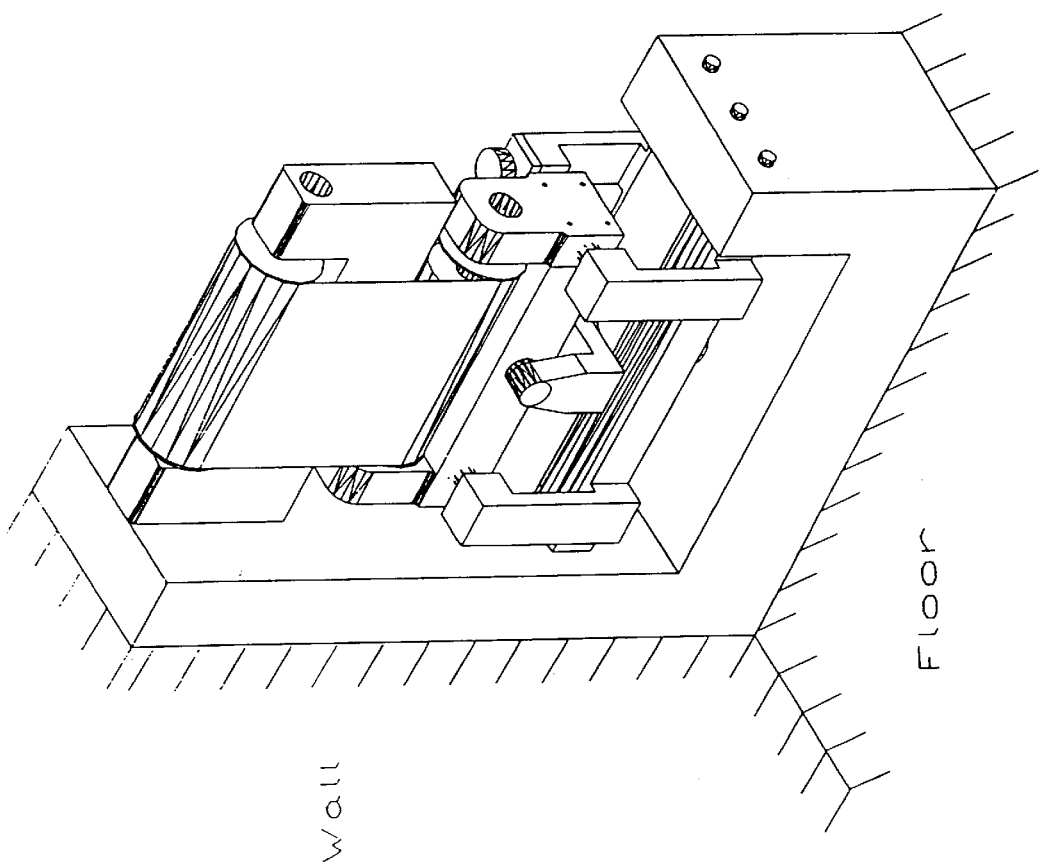

The CMP machine provided by the invention is further advantaged by its spatial flexibility resulting from a multiplicity of orientations of the CMP machine with respect to an installation space on which the CMP machine may be securely mounted. The orientation of the CMP machine is defined by the orientation of the polishing belt 1 (or the wafer supports 23) with respect to the floor on which the CMP machine is installed. If the orientation of polishing belt 1 or/and the wafer supports 23 is at a vertical position with respect to the floor, the machine is said to be vertically oriented, as shown in FIG. 1. An alternative way to setup the CMP machine is shown in FIG. 11, in which the polishing belt rotating vertically with reference to floor, the orientation of the polishing belt is horizontal with respect to the floor, the machine is said to be horizontally oriented. In any event, regardless of whether the CMP machine is said to be vertically or horizontally oriented, the CMP machine provided by the invention may be spatially arranged in a multiplicity of orientations with respect to the installation space such that the wafer or any other substrate is being held by the handling means with respect to a polishing plane defined by the belted polishing means 1 in such a manner that the normal vector to said polishing plane is substantially non-parallel or, preferably, perpendicularly to the gravitational acceleration vector.

Figure 10A:
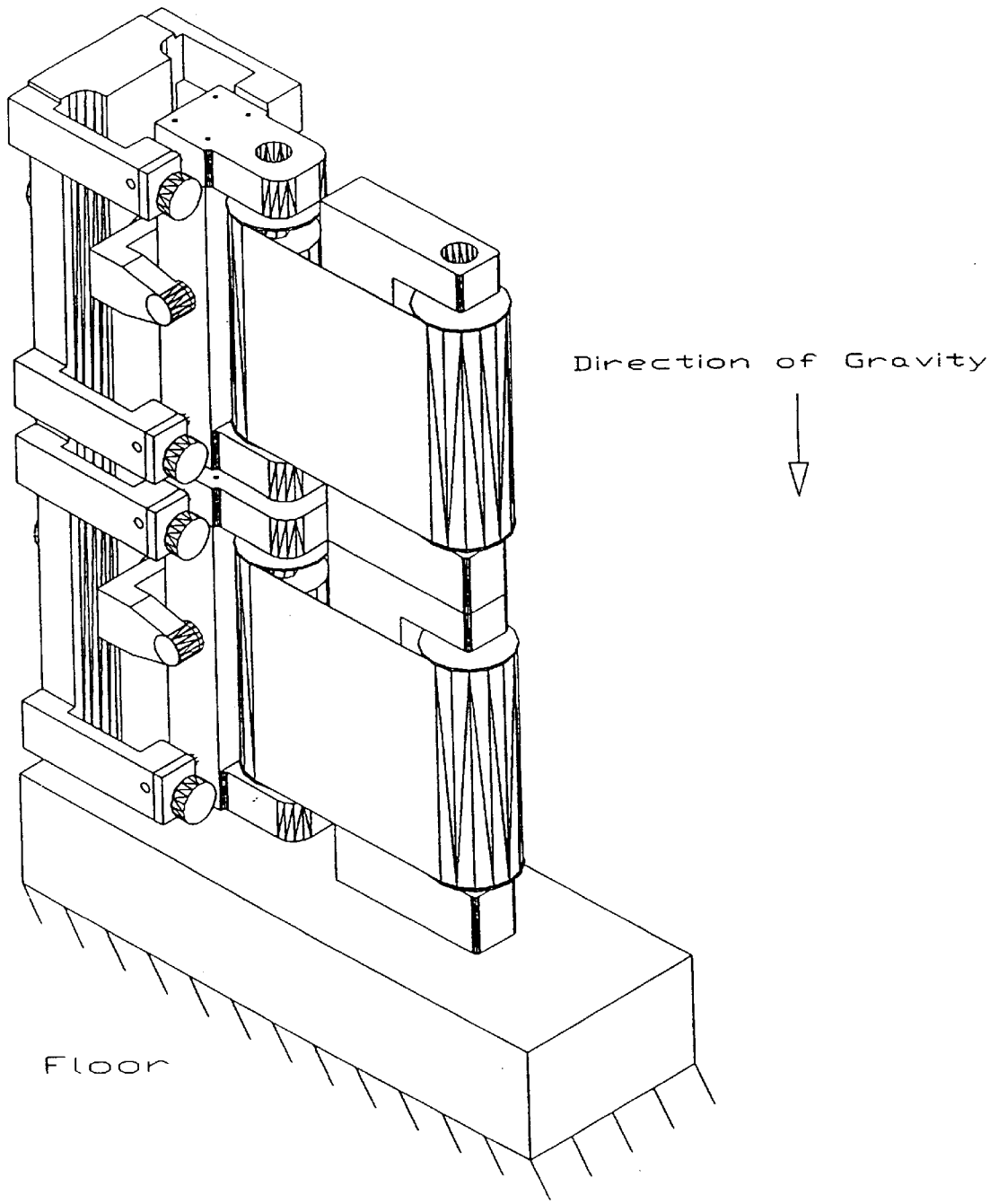
Figure 10C:
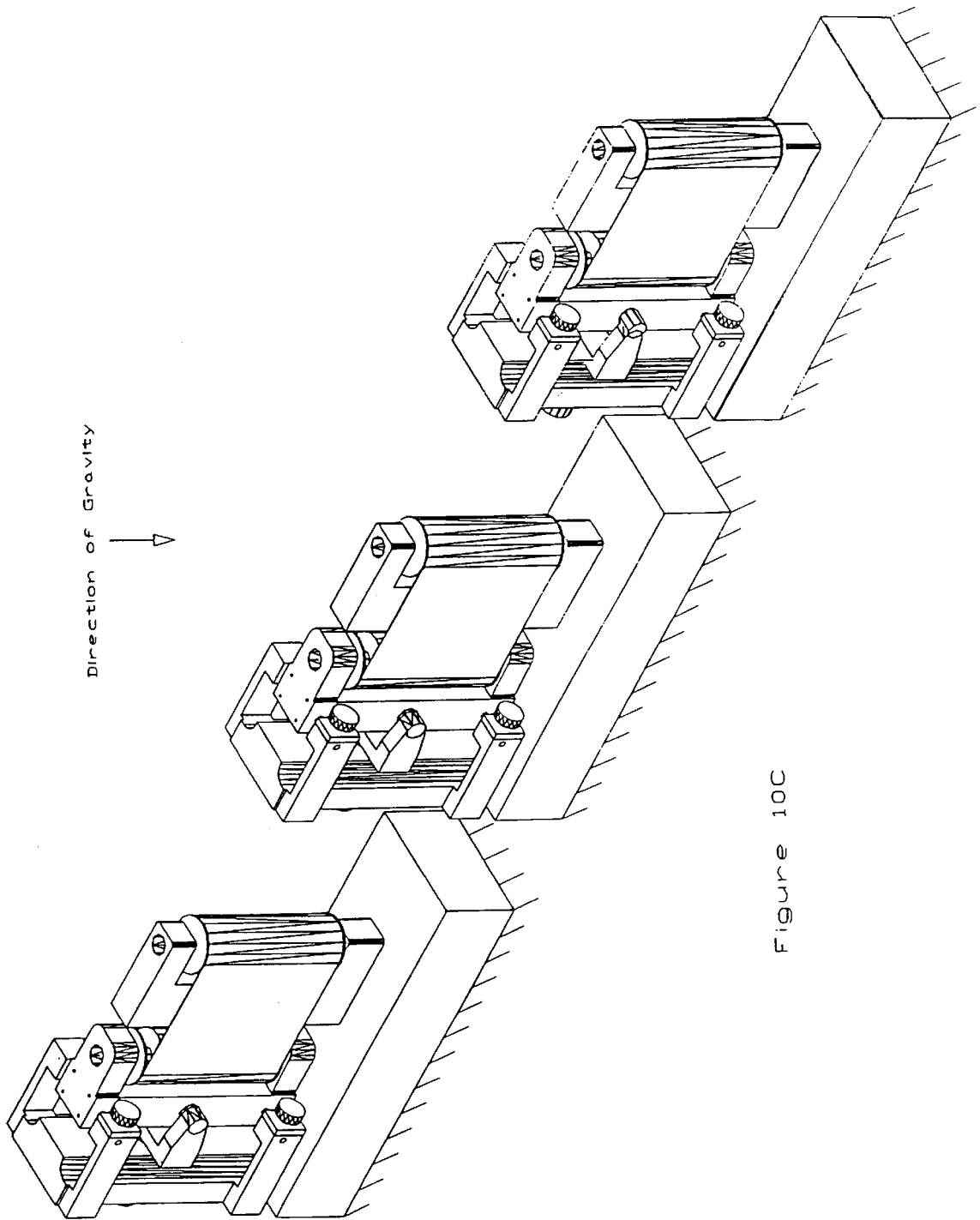

The advantage of the multi-oriented belted CMP machines according to the present invention may be better understood by ways of example with reference to FIG. 10 in which a plurality of the multi-oriented belted CMP machines may be arranged in different ways to accommodate different needs and purposes, such as space saving, enhancing wafer loading and unloading efficiency, etc. as so illustrated in FIG. 10A for a bottom to top configuration; FIG. 10B for a back to back configuration; and in FIG. 10C for a side to side configuration.

The advantages of the multi-oriented belted CMP machine as compared to the conventional rotary CMP machine become more apparent. First, the belt 1 moves linearly with a speed that ranges from 10 to 80 ft/sec depending also on the material of the wafers and the required removal thickness. This linear motion is uniform and the velocity is the same at all points on the belt and on the wafers. This will result in a uniform polishing rate for all points of the wafers and will eliminate the edge effects that undesirably associated with the conventional rotary CMP machines. Second, the multi-oriented belted CMP machine utilizes one linear motion to polish wafer instead of three rotational motions, thus greatly simplifying the CMP machine structure, reducing machine manufacture and maintenance costs, and increasing operational reliability. In addition, the linear motion with the uniform pressure applied on the wafer will reduce the risk of breaking wafers and is particularly suitable for larger wafers which are consequently more and more expensive. Furthermore, the floor mounting area (footprint) of a vertically oriented belted CMP machine is dramatically reduced, because such vertical orientation requires significantly less floor space. Since such a vertically oriented machine can be arranged in tandem, it can handle multiple wafers at a given time to increase polishing throughput as opposed to the conventional rotary CMP machines.

The belted CMP machine can also be used for polishing any substrate or object having a flat surface including, but without limitation to, wafers, flat panel displays (FPD), hard drive disk (HDD), hard disk magnetic drives or any other objects needed to be polished.

It will now be apparent to those skilled in the art that other embodiments, improvements, details, and uses can be made consistent with the letter and spirit of the foregoing disclosure and within the scope of this invention.

We claim:

1. A method for polishing an object, comprising:
   placing a support against an inside surface of a polishing belt in a first position;
   placing said object against an outside surface of said polishing belt in a second position, wherein said second position is directly opposite of said first position;
   adjusting a pulley that supports said polishing belt by moving said pulley along a first axis, rotating said pulley around said first axis, and rotating said pulley around a second axis, wherein said second axis is perpendicular to the first axis.

2. The method of claim 1, wherein a normal vector of said outside surface is substantially perpendicular to a gravitational acceleration vector.

3. The method of claim 2, wherein said first axis is substantially horizontal to the ground.

4. The method of claim 1, wherein said placing said support further comprises moving said support up and down against said inside surface of said belt.

5. The method of claim 1, wherein said placing said support further comprises rotating said support.

6. The method of claim 1, wherein said placing said object further comprises moving said object up and down against said outside surface of said belt.

7. The method of claim 1, wherein said placing said object further comprises rotating said object.

8. The method of claim 1, further comprising selecting a shape and a size for said support so that said object is held in steady contact with said outside surface of said polishing belt against said support.

9. The method of claim 1, wherein said object is a semiconductor material.

10. The method of claim 1, wherein said object is a wafer.

11. The method of claim 1, wherein said object is a flat panel display.

12. The method of claim 1, wherein said object is a magnetic data storage material.

13. The method of claim 12, wherein said magnetic data storage material is a hard drive disk.

14. The method of claim 1, wherein said polishing belt is a belt having a polishing pad firmly glued thereon.

* * * * *